United States Patent [19]

Howarth

[11] Patent Number: 5,276,861
[45] Date of Patent: Jan. 4, 1994

[54] GUARANTEED MESSAGE DELIVERY FROM A DATA HANDLING COMPUTER TO MANAGEMENT COMPUTER BY MONITORING THE MANAGEMENT COMPUTER WITH THE DATA HANDLING COMPUTER AND OTHER MANAGEMENT COMPUTER

[75] Inventor: David I. Howarth, Middlesex, Mass.

[73] Assignee: Bull HN Information Systems Inc., Billerica, Mass.

[21] Appl. No.: 671,063

[22] Filed: Mar. 18, 1991

[51] Int. Cl.$^5$ .................................. G06F 13/00
[52] U.S. Cl. ........................ 395/575; 395/325; 395/650; 364/240.9; 364/242.95; 364/268; 364/285.1; 371/11.1
[58] Field of Search ............ 395/325, 575, 650; 364/187; 371/8.1, 11.1, 11.3

[56] References Cited

U.S. PATENT DOCUMENTS

| | | | |
|---|---|---|---|
| 4,266,271 | 5/1981 | Chamoff et al. | 395/200 |
| 4,663,706 | 5/1987 | Allen et al. | 395/200 |
| 4,667,287 | 5/1987 | Allen et al. | 395/800 |
| 5,058,056 | 10/1991 | Hammer et al. | 395/650 |

*Primary Examiner*—Thomas C. Lee
*Assistant Examiner*—Burch Harper
*Attorney, Agent, or Firm*—Gerald J. Cechony; Gary D. Clapp; John S. Solakian

[57] ABSTRACT

In a distributed computer network having a large number of intercommunicating distributed nodes and a smaller number of control nodes in which each distributed node reports status information to a particular one of the control nodes, a method is provided for guaranteeing that at least one control node receives a status message from a distributed node despite the unavailability of the particular control node to which the distributed node normally sends its status messages. Each distributed node associates a serial number and time stamp and an identification of itself with each message it originates, and each distributed node retains copies of the messages. Should a distributed node be unsuccessful in transmitting to its normal control node it attempts to transmit to other control nodes until it transmits successfully. A control node assigned to assume the functions of an failed control node requests a distributed node formerly associated with the unavailable control node to resend all messages it originated within a period of time sufficiently long that at least all messages sent to the failed control since its failure are resent. Since replicate messages may be sent to a plurality of control nodes under this method, replicates are resolved by comparing the time stamps and originating node identifications.

1 Claim, 3 Drawing Sheets

EFTPOS 1
PRIOR ART

GUARANTEED MESSAGE DELIVERY FROM A DATA HANDLING COMPUTER TO MANAGEMENT COMPUTER BY MONITORING THE MANAGEMENT COMPUTER WITH THE DATA HANDLING COMPUTER AND OTHER MANAGEMENT COMPUTER

BACKGROUND OF THE INVENTION

1. Field of the Invention

The invention pertains to distributed computer networks, particularly to enhancing the reliability and functionality of network management functions in such networks by providing an inter-process message transmission method which guarantees that a message originated by a node will be received by at least one other node.

2. Description of the Prior Art

The invention is embodied in an EFTPOS (Electronic Funds Transfer/Point of Sale) system such as the one described in U.S. Pat. No. 4,879,716, "Resilient Data Communications System", issued Nov. 7, 1989 to McNally et al (hereinafter, "the McNally patent").

A large number of point-of-sale (POS) terminals are distributed over a very large geographical area, perhaps on the order of an entire continent. A communications network is provided which transports data over the entire geographical area, and all the POS terminals are connected to it, through telephone lines and intelligent line concentrators (called network access controllers or "NACs"). Also connected to the communications network are computers operated by financial institutions.

The POS terminals are typically placed into service by merchants, who then accept transactions from consumers who carry plastic credit cards or debit cards which bear in machine-readable form an identification of a financial institution which maintains an account for the consumer, and an identification of that account. The primary function of the system is to forward from the POS terminals to the financial institution computers information identifying a consumer's account and a transaction the consumer wishes to make in that account, and to return from the financial institution to the POS terminal either an acceptance or rejection of that transaction.

A merchant wishing to place a POS terminal into service typically obtains the necessary equipment (the terminals and associated modems, etc.) from a "service provider" organization. Such an organization might have no role in the EFTPOS system beyond that of providing equipment, or larger merchants and financial institutions might function as service providers; in that case the latter role is kept separated from the former.

In addition to line concentrators for POS terminals and computers of financial institutions being connected to the communications network as described above, two other classes of equipment are connected to it which exist ancillarily to the system's aforementioned primary function: network management systems (NMSs), and management workstations (WSs). (WSs are not specifically discussed in the McNally patent, but are at the heart of Subscriber Access Facilities (SAFs) 12 and are attached to NMSs 14 to provide an interface between operators and NMSs.)

NMSs are responsible for overall control and monitoring of the EFTPOS system; WSs are used by the network provider organization and service provider organizations to control and monitor particular equipment and communication paths for which they are responsible. As described in the McNally patent, the NACs can be dynamically reconfigured and can report their present status; operators and administrators at the WSs may enter commands to reconfigure the systems or commands requesting information on the current status of the systems. Commands originating at a WS are passed to an NMS for verification that the action or information requested is within the purview of the requesting organization, and are acted upon by the NMS following that verification.

The WSs and NMSs have software running in them to effect the entry of such commands and the responses to them. Each particular type of command typically invokes a particular path through the software, causing the execution of executable paths that are provided to perform particular functions required for a particular command. A software entity dedicated to a discrete function is known in the software arts as a "process".

WSs and NMSs are distributed throughout the geographical area served by the system. The NMS in a particular region of the geographical area generally exercises direct control and monitoring of the POS terminals and NACs in that particular region. A request pertaining to such a terminal or NAC and originating from a process in a WS or NMS in a different region must be forwarded over the communications network to a process in the NMS having cognizance of the target NAC, and a response must be forwarded back to the requesting process.

To enhance reliability of the EFTPOS system, provision exists to reconfigure NMSs, and the allocation of other system equipments to particular NMSs, in the event that one of the NMSs fails. The total number of NMSs is a function of total network size, within the constraints of system considerations: it would be operationally convenient to employ a small number of NMSs, each managing as many entities as possible, because this minimizes the number of inter-NMS transfers; but this represents a large unit of potential failure, and to guard against this a larger number of NMSs, each managing fewer entities, might be employed even though this is operationally inconvenient because it increases the number of inter-NMS message transfers required.

In the present embodiment, most of the entities being managed by NMSs are NACs, each NMS typically managing hundreds of NACs. NACs do not require constant management; management of a NAC typically entails the occasional forwarding of configuration commands, and periodic (presently, on the order of once every ten minutes) polling of each NAC's status. However, a NAC may occasionally request immediate attention, as when it detects an alarm condition and forwards an alarm message to an NMS, which may constitute a request for corrective action.

NMSs are also managed entities, inasmuch as each NMS monitors the others checking for continued functionality, and inasmuch as the NMSs exchange and respond to configuration information with each other.

Should an NMS become non-functional, requests and messages destined for it will not be honored until the system is reconfigured to reallocate the processes formerly performed by that NMS. There might therefore be a period of time during which alarm messages forwarded from a NAC to an NMS are lost—namely, the period from when that NMS becomes non-functional until the completion of the system reconfiguration to reallocate that NMSs functions. Although a NAC could retransmit those messages after such reconfiguration, it would be unable to request corrective action for the alarm condition until such time as reconfiguration is effected.

SUMMARY OF THE INVENTION

The present invention overcomes this prior-art degradation of service by providing intelligence in each NAC and intelligence in each NMS that cooperates synergistically with the intelligence in the NACs. When the NMS associated with a NAC fails, the NAC will search for another NMS, from a predefined list, to accept priority alarm messages. One or more other NMSs will be instructed to assume control of the affected NACs. As each NAC becomes associated with an NMS conditioned to accept communications from it, that NMS requests that NAC to retransmit all alarm messages and other control messages it originated during a past period of time substantially longer than the period required to process and distribute alarm messages.

OBJECTS OF THE INVENTION

It is thus a general object of the invention to improve reliability of distributed data systems.

It is a particular object of the present invention to provide distributed data systems having multiple control nodes with improved methods of recovering from the failure of a control node.

This and other objects of the invention will be apparent to those skilled in the art after reviewing the following description of the preferred embodiment and the appended drawings, wherein:

DESCRIPTION OF THE PREFERRED EMBODIMENTS

Figure 1:
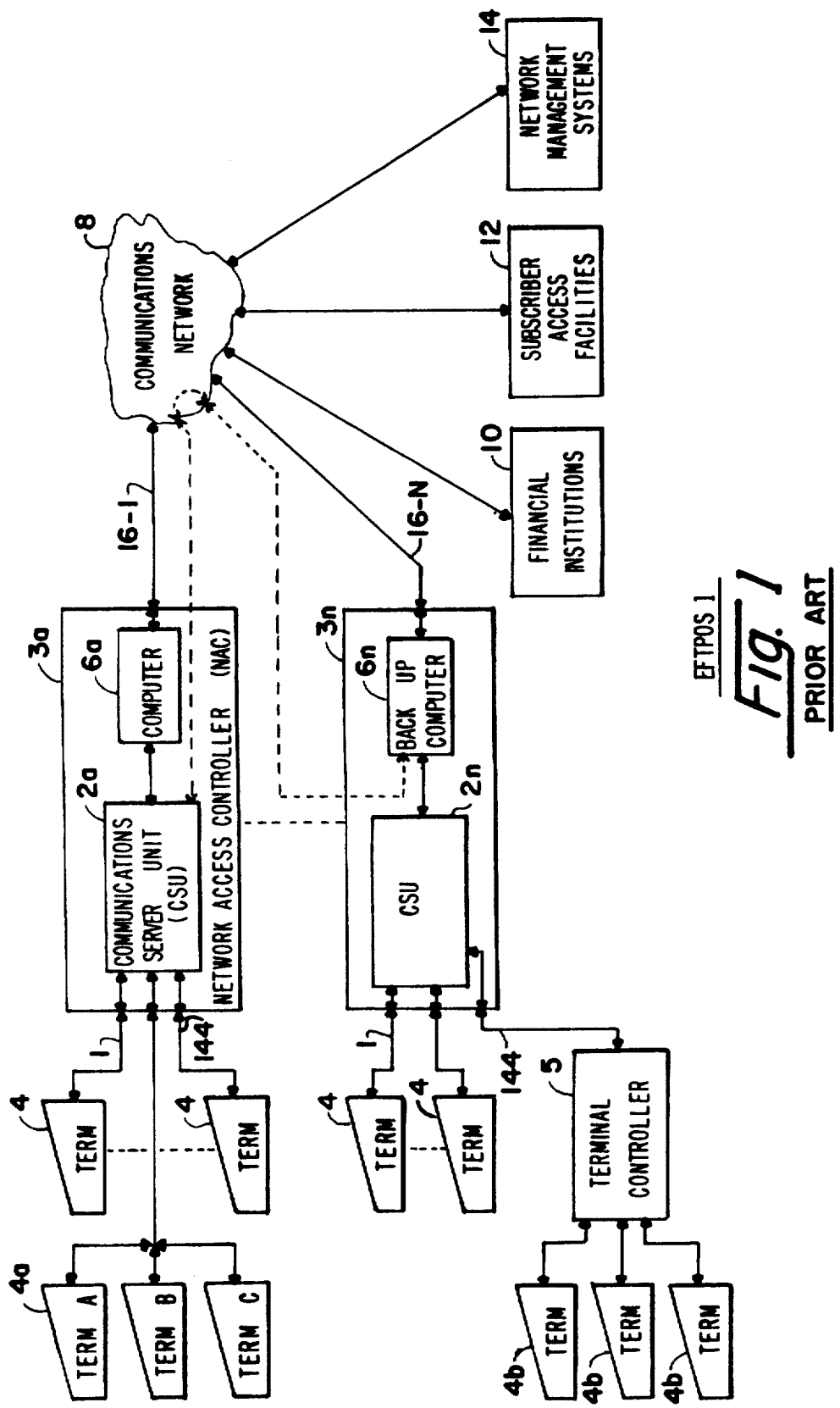
FIG. 1 provides an overview of the distributed data system in which the present invention is embodied.

FIG. 1, reproduced here from the McNally patent, provides an overview of the system in which the present invention is embodied, showing NACs 3, terminals 4, communications network 8, financial institutions 10, SAFs 12, NMSs 14, and communication lines 16. As noted above, workstations (WSs) are at the heart of SAF's 12; also, WSs are attached to NMSs 14.

Figure 2:
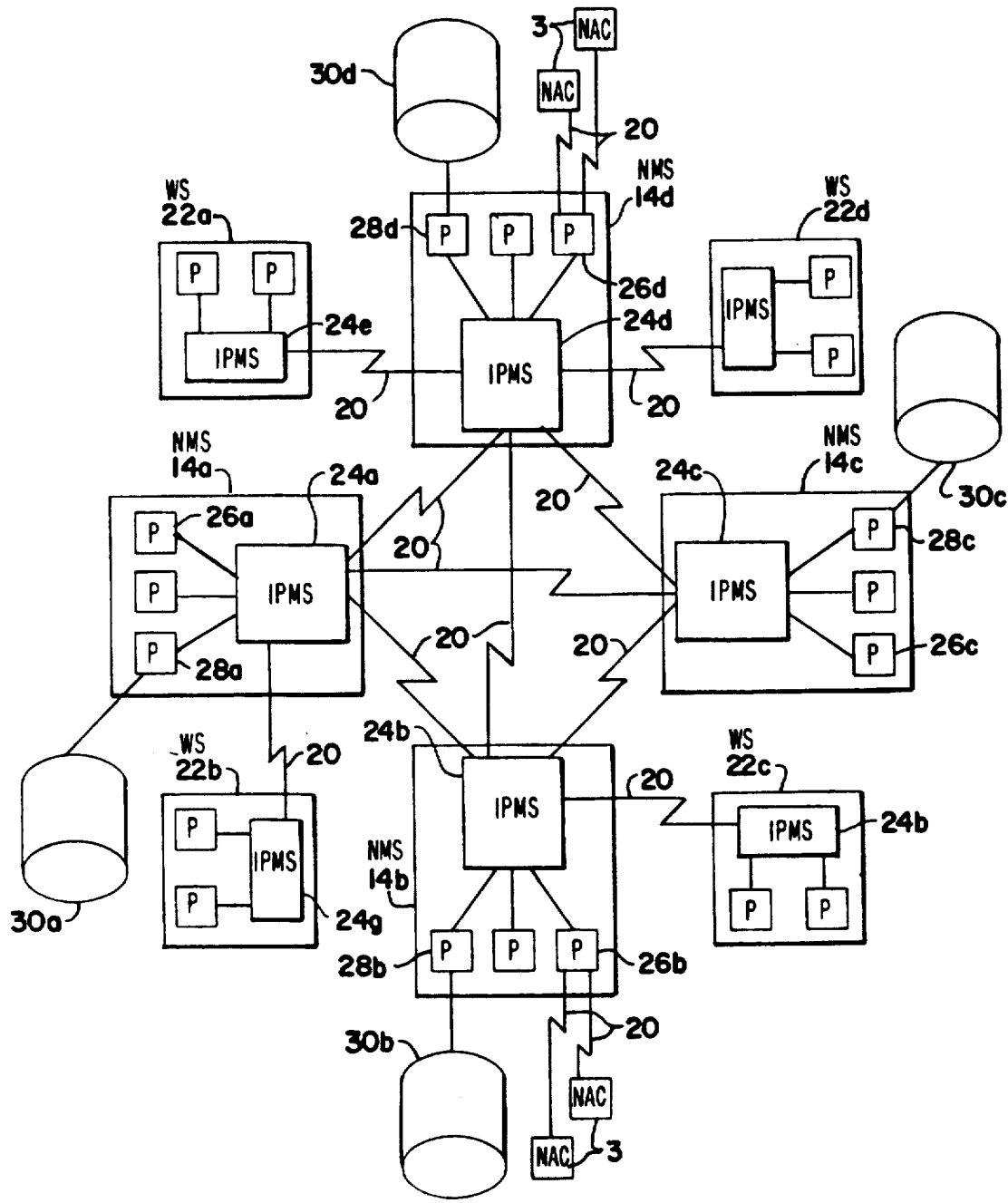
FIG. 2 provides further detail of that portion of the distributed data system embodying the present invention.

FIG. 2 provides greater detail in those portions of the system directly involved with the present invention. Four NMSs 14 are shown (the number four being chosen arbitrarily), denoted 14a through 14d. Four workstations (WSs) 22 (denoted 22a through 22d) are shown.

Each NMS and WS is depicted as hosting a number of processes "P". These are software processes; i.e., as discussed above, software entities dedicated to particular functional tasks.

The units depicted in FIG. 2 are shown as being interconnected by communication links 20. These links are conceptual, and might be implemented through communications network 8, or they might be LANs, WANs, leased or switched telephone lines. Regardless of the nature of the link between a WS and an NMS, a WS is normally linked to only one NMS; should the WS originate a command that must ultimately be resolved by a different NMS, said different NMS will be accessed as a result of NMS-to-NMS communication, and not by virtue of establishing a link between the WS and said different NMS.

A number of NACs 3 are shown in FIG. 2. As has been discussed, the primary purpose of the system is to carry data pertaining to financial transactions bidirectionally from terminals 4 (not shown in FIG. 2) through NACs 3 to financial institutions 10 (also not shown in FIG. 2). FIG. 2 does not depict this role of the NACs 3, but rather depicts the paths by means of which NACs 3 are controlled and interrogated. Of the plurality of processes shown in NMSs 14, processes 26 (26a through 26d) are instances of a process called the Administrative Traffic Switch (ATS) process, the function of which is pass control messages to NACs and to receive status and alarm information from NACs.

Working closely with ATS processes 26 are Network Status Monitor (NSM) processes 28, having an instance in each NMS. NSM 28 maintains a running record of the status of all the NACs (and all the data paths to terminals 4 effectuated by those NACs) within the administrative purview of a particular NMS.

Other processes anywhere in the system may wish to interrogate an instance of NSM 28 to determine the status of a system component or path, or to have an instance of ATS 26 forward an administrative command to a NAC. As FIG. 2 shows, every WS and NMS has resident an instance of the Inter-Process Message Service (IPMS) 24. Processes, regardless of whether resident in the same WS or NMS, do not communicate with each other directly, but through the IPMS.

Two system rules are adopted to make implementation easier, and are not inherent or essential: It is a system rule that processes in different workstations may not communicate with each other. It is also a system rule that any interprocess communication, only one NMS-to-NMS transmission is permitted. (In order to facilitate this, each NMS has a link 20 to every other NMS. This simplifies the detection of messages routed in a loop, and it minimizes transmission overhead. Neither is essential to the scheme as well-known algorithms exist for loop detection and transmission overheads are commonly traded against costs.)

Each NMS and WS is assigned a unique name. By way of example, if the geographical area to be covered were the continental U.S., the NMSs 14 might be located and named thusly:

One in the northwest, which might be named "NW-NMS";

One in the southwest, which might be named "SW-NMS";

One in the northeast, which might be named "NE-NMS"; and

One in the southeast, which might be named "SE-NMS".

Each NMS would typically manage NAC's in its geographical region, and respond to workstations in its geographical region. But, by configuring the NMSs and communications links appropriately, an NMS could, if need be, manage any NACs and respond to any workstations regardless of location.

Figure 3:
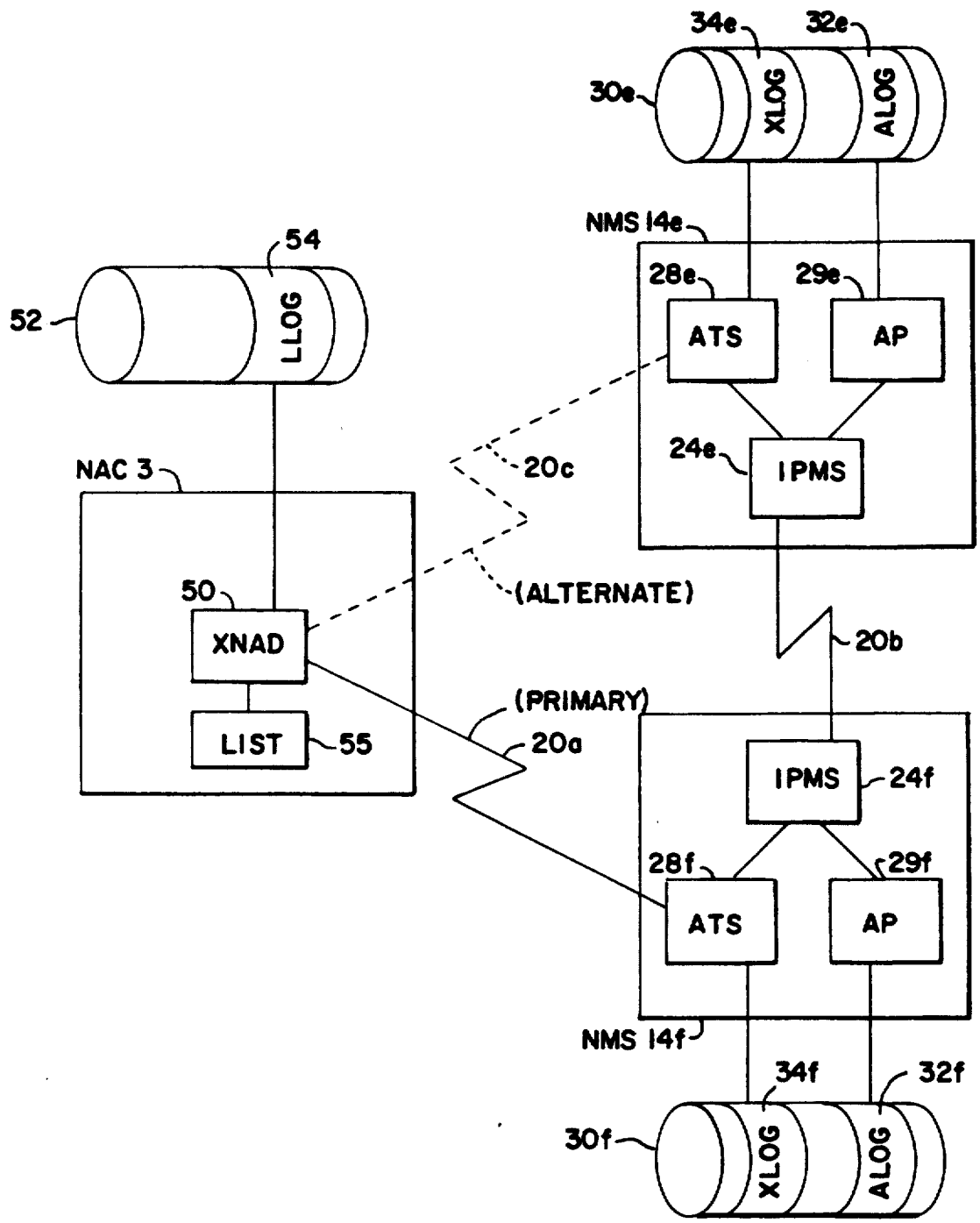
FIG. 3 depicts the scheme of the present invention.

FIG. 3 depicts details of the interaction between a NAC and and NMS. (It will be recalled that the primary function of the NAC is relay transactions between a POS terminal and a financial institution; this aspect is not shown in FIG. 3.) It will be recalled that an NMS typically manages hundreds of NACs; only one NAC 3 is depicted in FIG. 3, connected by communication link 20a to an NMS 14f.

Each managed entity including NAC 3 includes an XNAD process 50 which monitors the status of activities in the NAC, and maintains a status log file LLOG 54 on a storage medium 52. XNAD 50 may elect to consider certain status conditions as "alarm" conditions; it may further choose to classify such conditions as "high-priority" or "low-priority" alarm conditions. Each entry made in LLOG 54 includes a serial number unique within NAC 3 and containing a representation of system time. XNAD 50 is in communication with ATS (Administrative Traffic Switch) process 28f in NMS 14f (as are other processes in NAC 3 and processes in many other NACs), and periodically uploads its LLOG 54 entries. ATS 28f collects the status information from these many NACs and combines them in its combined log file XLOG 34f on storage medium 30f. Each entry is stored with the aforementioned serial number unique within the originating NAC, and with an identification of the originating NAC.

Alarm conditions reported to ATS 28f are passed (through IPMS 24f) to Alarm Processor (AP) process 29f, which logs them in Alarm Log 32f. AP 29f may then contact other processes, either in NMS 14f or anywhere in the entire system, with requests for actions to correct or compensate for conditions causing alarms; what form such requests might take and what actions might be taken in response to them do not bear on the present invention, which is concerned with guaranteeing that alarm messages reach the ALOG 32 file of some NMS 14, and thus those requests and responses will not be discussed herein.

NAC 3, as previously discussed, regards NMS 14f as its "normal" NMS; however, it is possible that NAC 3 will at times be unable to establish communication with NMS 14f, as when all circuits in the communication link 20 are busy, or when NMS 14f has failed and become nonfunctional. Should NAC 3 have an alarm condition to report, it attempts to make contact with any other NMS selected from the predetermined list of NMSs stored in List 55; in the context of FIG. 3, it will be assumed that NAC 3 makes contact with NMS 14e and reports the alarm condition thereto. All NMSs are prepared to accept such messages from any node on the network.

Should NMS 14f fail and become nonfunctional, other NMSs in the network (of which only NMS 14e is depicted in FIG. 3) will become aware that NMS 14f has failed by virtue of there being no response from it over communication links 20. These determinations will be made within a first period of time which the designer may determine empirically from observing the system, or by modeling the system. Under a method not germane to an understanding of the present invention, other NMSs on the system assume primary responsibility for all NACs for which a failed NMS (NMS 14f in this discussion) was responsible; here it is assumed that NMS 14e takes primary responsibility for the NAC 3 depicted in FIG. 3.

NMS 14e will then request NAC 3 to send all the entries it has made in its LLOG in the last second period of time substantially longer than the aforementioned first period of time. As noted above, the designer may determine the first period empirically from observation of the system, or by modeling the system. During development of the system, the initial determination of the second period of time should be extremely generous; as observation of the system refines the designer's assessment of the first period of time, he may reduce the second period of time commensurately, being careful to keep it substantially longer than the first period of time.

Some of the messages previously forwarded from NAC 3 to NMS 14f will be resent to NMS 14e. It is a normal function of alarm processing to check for duplicate alarm reports and to discard the second and subsequent occurrences.

Those skilled in the art will perceive applications of the invention in embodiments other than the one described here. The invention is intended to be embraced by the appended claims and not limited by the foregoing embodiment.

I claim:

1. In a networked data transmission system including at least one data processing computer, a plurality of data handling computers, each data handling computer having at least one data input device connected thereto to provide data inputs to the data handling computer and being connected to a communications network for transmitting data from the data handling computer to the at least one data processing computer, and a plurality of network management computers selectively connected to the plurality of data handling computers through the network for managing operations of the data handling computers, each network management computer being selectively assigned responsibility for managing operations of an assigned plurality of data handling computers and including means for receiving and responding to messages from the assigned plurality of data handling computers, a method for assuring that the messages from a data handling computer will be received by at least one network management computer, comprising the steps of:

in each data handling computer,
storing a list of alternate network management computers to which the data handling computer may establish a communication connection through the network in substitution for an assigned network management computer assigned to the data handling computer;
storing in a log a copy of each message from the data handling computer to the assigned network management computer, the log storing messages for a first continuous time interval greater than a first predetermined time period;
determining that the assigned network management computer does not respond to messages from the data handling computer within a second time interval greater than the first predetermined time period and lesser than the first continuous time interval; and;
when no response is received from the assigned network management computer within the second time interval,
determining an alternate network management computer from the list of alternate network management computers,
establishing a communication connection with the alternate network management computer, and,
transmitting the copy of each message from the log to the alternate network management computer to be acted upon by the alternate network management computer; and,
in at least one network management computer, monitoring the operation of at least one other network management computer;

determining when the at least one other network management computer has not transmitted a message to or received a message from at least one network management computer during a time interval greater than a second predetermined time period;

determining the assigned plurality of data handling computers assigned to the at least one other network management computer;

transmitting a request to at least certain of the assigned plurality of data handling computers to transmit the copy of each message stored in the logs of the at least certain of the assigned plurality of data handling computers to the at least one network management computer; and, responding to the copy of each message transmitted from the logs of the at least certain of the assigned data handling computers.

* * * * *